3,730,693
HYDROCARBONS AND NONPOLAR SOLVENTS GELLED WITH A LIPOPHILIC POLYMERIC CARBOHYDRATE DERIVATIVE
James Teng, St. Louis County, Mo., Chokun Rha, Southbridge, Mass., and Barry L. Scallet, Clayton, and Marcella C. Stubits, St. Louis, Mo., assignors to Anheuser-Busch, Incorporated, St. Louis, Mo.
No Drawing. Continuation-in-part of applications Ser. No. 845,067, July 25, 1969; Ser. No. 44,640, June 8, 1970; and Ser. No. 106,882, Jan. 15, 1971. This application June 17, 1971, Ser. No. 154,219
Int. Cl. C101 7/00
U.S. Cl. 44—7 B
12 Claims

ABSTRACT OF THE DISCLOSURE

A polymeric carbohydrate derivative such as cellulose laurate or starch laurate with a percentage of substitution between about 40% and about 100% is dispersed or dissolved in jet fuel or other hydrocarbon or nonpolar solvent at a concentration of at least about 0.5 gram solids/100 ml. fluid. The gelled jet fuel is helpful in avoiding fires in aircraft accidents.

REFERENCE TO OTHER APPLICATIONS

This application contains subject matter in common with and is a continuation-in-part of co-pending applications Ser. No. 845,067 now abandoned, filed July 25, 1969; Ser. No. 44,640 filed June 8, 1970; and Ser. No. 106,882 filed Jan. 15, 1971.

BACKGROUND OF THE INVENTION

Fire and smoke inhalation cause many deaths in otherwise survivable aircraft accidents. Investigations indicate that the fires usually are caused when the highly volatile fuel spills from damaged tanks and splatters throughout the wreckage. Fuel vaporizes and is easily ignited by hot engine parts or sparks from metal impact. Preliminary studies have demonstrated that gelled or thickened fuels, including fuels treated to form even free flowing very thin gels, are less likely to explode or burst into flames under aircraft crash conditions, and thus gelled or thickened fuels are a safety factor in jet aircraft.

We have developed cellulose and starch derivatives and a set of processing conditions to produce gelled or thickened jet fuel. Gelation or thickening is achieved by us on the basis that particles or dissolved polymers of carbohydrate derivatives can agglomerate to form a coherent structure and trap the fuel within the gel matrix. Polymeric carbohydrate, which is ordinarily highly incompatible with fuel, is chemically substituted at its hydroxyl functions so that it acquires an affinity for the fuel.

Thus, one of the principal objects of the present invention is to provide a hydrocarbon or nonpolar solvent gelled or thickened with a lipophilic polymeric carbohydrate derivative. Another principal object of this invention is to provide a gelled jet fuel having incorporated therein a cellulose laurate or a starch laurate. Still another object is to provide a method of making a gelled or thickened jet fuel from cellulose laurate or starch laurate. Other objects and advantages will become apparent hereinafter.

SUMMARY OF THE INVENTION

This invention comprises a gelled or thickened hydrocarbon product comprising fluid hydrocarbon and particles of lipophilic polymeric carbohydrate derivative. This invention further comprises a process of making said product.

The invention is not limited to laurate derivatives although this is preferred at present. Other esters or derivatives of starch, cellulose and other polymeric carbohydrates also possess enough lipophilic property to perform similarly. The gelling or thickening is not confined to jet fuel, as other hydrocarbon and nonpolar solvents can also be gelled.

DETAILED DESCRIPTION

In the present invention, a lipophilic polymeric carbohydrate derivative, preferably cellulose laurate, is used with a hydrocarbon, preferably jet fuel. The lipophilic polymeric carbohydrate derivative has a percentage of substitution of 40% to 100%, preferably 68% to 98%. That means, on the average, 40% to 97% of the theoretically available hydroxyl functions per monosaccharide unit are substituted with lipophilic groups. The substitution must be carried out to the extent that the polymeric carbohydrate derivative acquires sufficient affinity for the fuel to permit solvation and dispersion.

Other starch, cellulose and other polymeric carbohydrate esters and derivatives which may be used satisfactorily in the invention include stearate, oleate, octanoate and carbanilate.

The liquids which are gelled include liquid hydrocarbons and nonpolar solvents, specifically jet fuel and gasoline. Other suitable solvents and hydrocarbons are hexane, dodecane, cyclohexane, toluene, xylene, chloroform, methyl bromide, tetrahydrofuran, dioxane and glycerides of unsaturated fatty acids.

The amount of polymeric carbohydrate derivative is at least about 0.5 gram per 100 ml. liquid hydrocarbon and may be as much as about 15 g./100 ml. Preferably about 2 to about 6 g./100 ml. is used.

The moisture content of the carbohydrate derivative is between about 0 and 0.5% and preferably is about 0.1% by weight, although this is not critical.

The carbohydrate derivative is mixed with the hydrocarbon until a colloidal dispersion or solution of a carbohydrate derivative in a hydrocarbon is formed. This may be done in a Waring Blendor, by homogenization, or any other suitable mixing means. The time of mixing is between about 2 and about 10 minutes or longer depending on the intensity of agitation and the size of the mixing vessel. The temperature of the hydrocarbon during mixing is between about 25° C. and about 85° C. The particle sizes of the polymeric carbohydrate derivative in dispersion may vary between about $0.001\mu$ and about $1\mu$ after blending into the fluid. The particle size before being incorporated into the fluid generally is greater.

After mixing, the polymeric carbohydrate derivative-hydrocarbon mixture is allowed to stand for about 5 minutes to about 10 hours to complete gelation of thickening.

The final gel has a specific gravity of substantially that of the solvent being gelled and in the case of jet fuel the specific gravity of the gel is between about 0.7 to about 0.9, preferably about 0.78 and about 0.85, and a minimum viscosity of 100 centipoise.

An advantage of using cellulose laurate over starch laurate, particularly in gelling jet fuels, is the higher stability temperature and shorter gelling speeds of cellulose laurate. Cellulose laurates having a melting point range of about 70–110° C. as compared to starch laurates 40–45° C.

Cellulose laurates gel within 20 minutes at concentrations of as little as 1 g./100 ml., whereas starch laurates require 5–6 g./100 ml. to gel jet fuel in 8–10 hours.

Following are specific examples of our invention.

Example No. 1

32 gms. of starch granules are suspended in 500 ml. of a mixture of hot pyridine and dioxane at a temperature of 90° C. The mixture contains 20% pyridine and 80% dioxane by weight. The suspension is achieved by continuous agitation. The uniform suspension is then allowed to react with 240 gms. of lauroyl chloride until a percentage of substitution of 80% is achieved. This percentage of substitution is equivalent to a degree of substitution (D.S.) of 2.4. D.S. is a term commonly used in starch and cellulose technology where the maximum theoretical value is 3. This takes 4 hours and is at a temperature of 85° C. Crude starch laurate is then precipitated with the addition of 1000 ml. of methanol at a temperature of 25° C., purified by washing its chloroformic solution with 1000 ml. of water, and is finally reprecipitated by the addition of 1000 ml. of methanol. After drying to a moisture content of 0.2%, the purified starch derivative product 110 gms. appears as a brittle resinous substance. 6 grams of this starch laurate is finely dispersed in 100 ml. of JP-7 fuel (a mixture of kerosene and gasoline), at a temperature range of 45–65° C. with the aid of a Waring Blendor operated at a speed of 16,000 r.p.m. for 5 minutes to obtain colloidal dispersion. The particle sizes of the starch product in dispersion are tentatively estimated to be ranging from 0.01 to 1$\mu$. A minimum solid concentration of 4 gms. per 100 ml. fuel is necessary for gelling. The mix is allowed to stand for 15 minutes at a temperature of 25° C. to gel the suspension to a specific gravity of 0.80 and a minimum viscosity of 100 poise as measured by a Brookfield Viscometer.

A second run under the same conditions gave a gel with a yield stress of 600 dynes/cm.$^2$.

Example No. 2

32 grams granular starch in 75 grams of 10% aqueous sodium hydroxide is reacted with 40 grams lauroyl chloride at a temperature of 60° C. for 2 hours to produce a starch laurate having a percentage of substitution, 50%–58%. This is washed with hot water and purified and dried as in Example No. 1 and mixed with kerosene at a rate of 6 grams starch derivative/100 ml. kerosene. The mixing is in a Waring Blendor for 10 minutes at a speed of 16,000 r.p.m. A colloidal suspension is formed and upon standing for two hours the suspension gels to a minimum viscosity of 200 poise.

A second run under the same conditions gave a gel with a yield stress of 700 dynes/cm.$^2$.

Example No. 3

48 grams granular starch is mixed with 197 grams of methyl laurate in 200 ml. of dimethyl formamide which contains 4 grams of sodium methoxide as catalyst. The mixture is placed under a reduced pressure of 85 mm. Hg to remove methanol generated. After 6 hours at 90° C., the entire content is discharged into 2 liters of methanol, and the precipitate washed with hot water and then dried. The starch derivative has a percentage of substitution of 38%–60% and is capable of gelling hydrocarbon under the same conditions as Example No. 2.

Example No. 4 (gels containing non-polar solvents)

By using the same technique as in Examples Nos. 1–3 using jet fuel, we have prepared gels with a number of other nonpolar solvents. Examples of these solvents are listed as the following:

Hexane: A straight aliphatic hydrocarbon
Cyclohexane: An alicyclic hydrocarbon
Toluene: An aromatic hydrocarbon
Chloroform: A halogenated hydrocarbon
Methyl bromide: A halogenated hydrocarbon
Tetrahydrofuran: A heterocyclic compound
Peanut oil: A glyceride of essentially unsaturated fatty acids Additional individual examples are set out in Examples 14–19.

Example No. 5

Starch, 16 gms., is dispersed in dioxane, 100 ml., containing 50 ml. of pyridine as a basic catalyst. The suspension is maintained at 90° C. for 1 hour. At the end of this time, oleoyl chloride, 150 gms., is introduced gradually. The reaction mixture remains in vigorous agitation for 6 hours at 95° C. The mixture is then poured into 2 liters of methanol and the starch oleate settles down as a highly viscous material. The crude oleate is then dissolved in chloroform, the solution washed with water and reprecipitated by 2 liters of methanol. After drying at 85° C. for 8 hours, the starch oleate is obtained as a dark resinous substance having a percentage of substitution of 68%.

Example No. 6

Starch stearate is prepared in a manner similar to starch oleate or laurate (Examples Nos. 1–5). The acyl chloride is stearoyl chloride. Starch stearate is a dark brown solid at the percentage of substitution of 80%.

Example No. 7

Starch octanoate is prepared in a manner similar to starch oleate (Example No. 1). Octanoyl chloride is used instead of oleoyl chloride. Starch octanoate has the appearance of a stiff gum at the percentage of substitution of 64%.

Example No. 8

A thoroughly dried starch, 10 gms., is dispersed in 100 ml. of pyridine and is allowed to react with phenyl isocyanate, 44 gms., after the suspension has reached 95° C. The reaction mixture is kept at this temperature for 12 hours. The reaction is interrupted by pouring the mixture into 1 liter of methanol. The precipitated starch carbanilate, a brownish mass, is resuspended in methanol, filtered and dried. It has a percentage of substitution of 84%.

Example No. 9

Trioxymethylene (33 gms.), calcium chloride (120 gms.) and dodecanol (235 ml.) are mixed together. Dry hydrogen chloride is then bubbled through the mixture at room temperature for 6 hours to form chloromethyl dodecanyl ether.

Chloromethyl dodecanyl ether (20 gms.) is added to react with 2 gms. of starch in 150 ml. of dimethyl formamide at 80° C. for 1 hour. The reaction mixture is poured into 1 liter of methanol, filtered and washed. The product has a percentage of substitution of 50%.

Examples Nos. 5–8 show the preparation of starch esters and Example No. 9 shows the preparation of a starch ether. These esters and ethers are mixed with jet fuel and other non-polar solvents following the processes of Examples Nos. 1–4 to produce gelled products.

Example No. 10

Dissolving grade wood pulp (Buckeye Cellulose Corp., E-22), 11 gms., is dispersed in a mixture of dioxane, 600 ml., and pyridine, 32 ml. The mixture is warmed to 90° C. for 1 hour followed by the addition of lauroyl chloride, 170 gms. Reaction proceeds for 7 hours at 100° C. At the end of this period, the reaction mixture is stirred with 1 liter of methanol, whereupon the cellulose laurate precipitates. The cellulose laurate has a percentage of substitution of 90%–98% or a D.S. of 2.7 to 2.9.

The cellulose laurate is dissolved in chloroform, 600 ml., and washed with four 250 ml. portions of water. Mixing the chloroform solution with 1 liter of methanol after the water wash causes the precipitation of clean cellulose laurate. The resinous precipitate is dried at 85° C. for 6 hours.

Dispersion of this dry material at 85° C. in Jet A fuel yields viscous solutions which gel upon cooling to room temperature. A gel of 2 g./100 ml. has a melting point of 70° C. At 4 g./100 ml. the melting point rises to 110° C.

A second run made using V-68 Buckeye Cellulose Corp. wood pulp gave a gel which has a viscosity of 12,000 centipoise (measured with Brookfield RVT Viscometer, No. 6 spindle, 20 r.p.m., 25°) and a yield stress of 350 dynes/cm.$^2$.

Example No. 11 (preparation of cellulose laurate powder)

Dissolving grade wood pulp (Buckeye Cellulose Corp., E-22), 11 gms., is dispersed in a mixture of dioxane, 600 ml., and pyridine, 32 ml. The mixture is warmed to 90° C. for 1 hour followed by the addition of lauroyl chloride, 170 gms. Reaction proceeds for 7 hours at 100° C. At the end of this period, the reaction mixture is stirred with 1 liter of methanol, whereupon the cellulose laurate precipitates.

The cellulose laurate precipitate is then dried over a vacuum filter and dissolved in 800 ml. of chloroform. The concentration of the cellulose laurate-chloroform solution should be about 5 g./100 ml.

Under vigorous agitation methanol is added slowly until the solution begins to become cloudy. It requires 600 ml. of methanol to reach this "cloud point." Quickly, 1000 ml. of methanol is well stirred into the solution to bring about a rapid precipitation of cellulose laurate as finely divided powder.

The powder is filtered and dried. The particle size ranges from 40 to 80 mesh (U.S. Standard Sieves) and weighs 40 gms.

This powder has the advantage over the cellulose laurate precipitate of Example No. 10 in that it can be dispersed in jet fuel at a lower temperature, i.e., on the order of 30° C. This is important in field operations where the laurate derivative may be mixed into the jet fuel at the place where the fuel is to be loaded into a plane.

Also, this powder can be mixed into jet fuel using a simple mixer rather than a homogenizer or Waring Blendor. This also facilitates field mixing.

Example No. 12

Cellulose laurate can also be prepared without the benefit of dispersion in a liquid solvent.

Shredded cellulose pulp (0.4 kg.) is placed in a heavy duty kneader, e.g. Sigma blade kneader. Pyridine (2.54 liters) is distributed even over the pulp. The pulp remains quite dry at this stage. It needs only a small amount of dioxane (about 2 liters) to render it pliable for kneading. Lauroyl chloride (4.52 kg.) is then incorporated and a reaction temperature of 100° C. is maintained for 4½ hours. The cellulose mixture becomes progressively more pasty and eventually to a doughy consistency at the end of the reaction time. Excess reagents are washed with methanol. The washed cellulose laurate can be purified further using chloroform as described in Examples Nos. 10 and 11.

The much reduced fire hazard of the cellulose laurate gelled jet fuel has been demonstrated by F.A.A. tests. The F.A.A. "impact test" measured 93-100% reduction of heat released upon firing using cellulose laurate gelled jet fuel made in accordance with the procedures of this application.

Using starch laurate gelled jet fuel in the F.A.A. "impact test," the reduction in heat released on firing is 80-90%.

Example No. 13

Powdered cellulose (Buckeye pulp, V-68), 480 g., is slurried into 14 liters of toluene. Pyridine, 3.1 liters, is added to the slurry under agitation in a glass lined, 10-gal. Pfaudler pressure reactor and the addition of pyridine is followed by the introduction of lauroyl chloride, 5.47 kg. The content, heated to 100° C., is under a constant stirring speed of 400 r.p.m. The total reaction time from the time of lauroyl chloride addition is 5 hours. The reactor is totally closed and the pressure within reaches 15 p.s.i.

At the end of reaction, the viscous mixture is discharged. Five gallons of methanol is blended into the reaction mixture at a steady rate of 2 gal./min. The precipitated powder is filtered and washed with methanol and dried.

This cellulose laurate has a D.S. of 2.92. A smooth flowing gelled fuel is obtained with this material at a concentration of 2.2 g./100 ml. The gel has a viscosity of 100 centipoise (Brookfield, No. 3 spindle, 10 r.p.m. 25°) and a yield stress of 120 dynes/cm.$^2$. In spite of the low viscosity, the gel meets the fire safety requirement (impact test) of F.A.A.

Example No. 14

Cellulose laurate in powder form prepared by the method illustrated in Example 11 can be used to gel cyclohexane. For this application the degree of substitution, D.S., should be adjusted between 2.7 and 2.8. The powder, 2.0 g. is blended with cyclohexane, 100 ml., at 40° C. for a period of 10 minutes until uniformly dispersed. The solution gels upon cooling.

Example No. 15

Cellulose laurate of a wide range of D.S. (2.4–2.9) can gel toluene. As in the previous example, cellulose laurate powder (D.S. 2.5) is mixed well into toluene at a concentration of 3 g./100 ml. The solution thickens immediately and gels after standing at room temperature for a period of 15 minutes.

Example No. 16

Dichloropropenes is gelled by cellulose laurate having a D.S. range of 2.2–2.4. The same simple mixing technique is used here to gel dichloropropene as in the case of cyclohexane. The gelling agent concentration is 2.8 g./100 ml. Isomers of dichloropropenes are being used as agricultural fumigants.

Example No. 17

Chloropicrin gel is prepared with cellulose laurates of a D.S. range of 2.1–2.3. Two grams of the cellulose laurate powder is homogenized in a tightly sealed blender. The solution readily forms a gel as the temperature decreases from the mixing temperature of 50° C. to the ambient temperature.

Example No. 18

Cellulose laurate conveniently gels tetrahydrofuran at the temperature of 40° C. when the D.S. is adjusted to the range of 2.7–2.8. Depending upon the consistency desired, the effective concentration can be as low as 2.2 g./100 ml.

Example No. 19

Thick gels of unsaturated vegetable oil such as peanut oil are prepared by dispersing cellulose laurate (D.S. 2.65–2.85) in the oil at a concentration of 3.2 g./100 ml. Dispersion and gellation is facilitated by heating the mixture to 100° C. during mixing. This gel will have high yield stress (minimum, 2000 dynes/cm.$^2$) and has the appearance of margarines.

Thus, it is seen that the present invention provides a means whereby polymeric carbohydrate derivatives, when properly processed, will gel liquid hydrocarbons.

This invention is intended to cover all changes and modifications of the examples of the invention herein chosen for purposes of the disclosure, which do not constitute departures from the spirit and scope of the invention.

What we claim is:

1. A gelled or thickened hydrocarbon or non-polar solvent consisting essentially of from about 0.5 to about 15 grams of lipophilic polymeric carbohydrate derivative per 100 ml. of said hydrocarbon or solvent, said lipophilic polymeric carbohydrate derivative having 40–100% of the theoretically available hydroxyl functions substituted with lipophilic groups.

2. The product of claim 1 wherein the hydrocarbon is jet-type fuel.

3. The product of claim 1 wherein the polymeric carbohydrate derivative is cellulose laurate.

4. The product of claim 1 wherein the polymeric carbohydrate derivative is starch laurate.

5. The product of claim 1 having a specific gravity of about 0.7 to about 0.9.

6. The product of claim 1 wherein the polymeric carbohydrate derivative is cellulose laurate and the hydrocarbon is jet-type fuel, there being about 0.5 to about 12 grams cellulose laurate per 100 ml. of jet-type fuel and the gel having a specific gravity of about 0.7 to about 0.9.

7. The product of claim 1 wherein the polymeric carbohydrate derivative is starch laurate and the hydrocarbon is jet-type fuel, there being about 2 to about 12 grams starch laurate per 100 ml. of jet-type fuel and the gel having a specific gravity of about 0.7 to about 0.9.

8. A process of gelling or thickening a fluid selected from the group of hydrocarbons and nonpolar solvents comprising adding to said fluid from about 0.5 to about 15 grams of a lipophilic polymeric carbohydrate derivative per 100 ml. of said fluid, said lipophilic polymeric carbohydrate derivative having 40–100% of the theoretically available hydroxyl functions substituted with lipophilic groups, mixing said fluid and said derivative, allowing said mixture to stand for at least 5 minutes until said fluid is thickened or a gel is formed, and recovering a product containing said lipophilic polymeric carbohydrate microns and about 1 microns.

9. The process of claim 8 including the step of recovering a gelled product which will withstand temperatures of greater than about 55° C. without melting.

10. A process of gelling jet fuel comprising the steps of dispersing from about 0.5 to about 12 grams of cellulose laurate in 100 ml. of jet fuel, said cellulose laurate having a percentage of substitution between about 40% to about 100% and recovering a gelled jet fuel which is stable above about 55° C. and which contains cellulose laurate particles of about $0.001\mu$ to about $1\mu$ in size.

11. A process of gelling jet fuel comprising the steps of dispersing from about 2 to about 12 grams of starch laurate in 100 ml. of jet fuel, said starch laurate having a percentage of substitution between about 40% to about 100%, and recovering a gelled jet fuel having a specific gravity between about 0.7 to about 0.9, and which contains starch laurate particles of between about $0.01\mu$ and about $1\mu$ in size.

12. The process of claim 8 wherein the lipophilic polymeric carbohydrate derivative is a cellulose derivative.

References Cited

UNITED STATES PATENTS

| | | | |
|---|---|---|---|
| 2,578,433 | 12/1951 | Labour | 44—7 B |
| 2,581,441 | 1/1952 | Roab | 44—7 B |
| 2,798,098 | 7/1957 | Linn | 44—7 B |
| 1,993,517 | 3/1935 | Kranich | 44—7 B |
| 2,618,536 | 11/1952 | Hunn | 44—7 A |
| 3,334,053 | 8/1967 | Audrieth et al. | 44—7 B |

BENJAMIN R. PADGETT, Primary Examiner

U.S. Cl. X.R.

149—109